June 6, 1967 C. J. McMULLEN 3,323,777
ANTI-BACKLASH WORM GEAR JACK
Filed Oct. 28, 1964 2 Sheets-Sheet 1
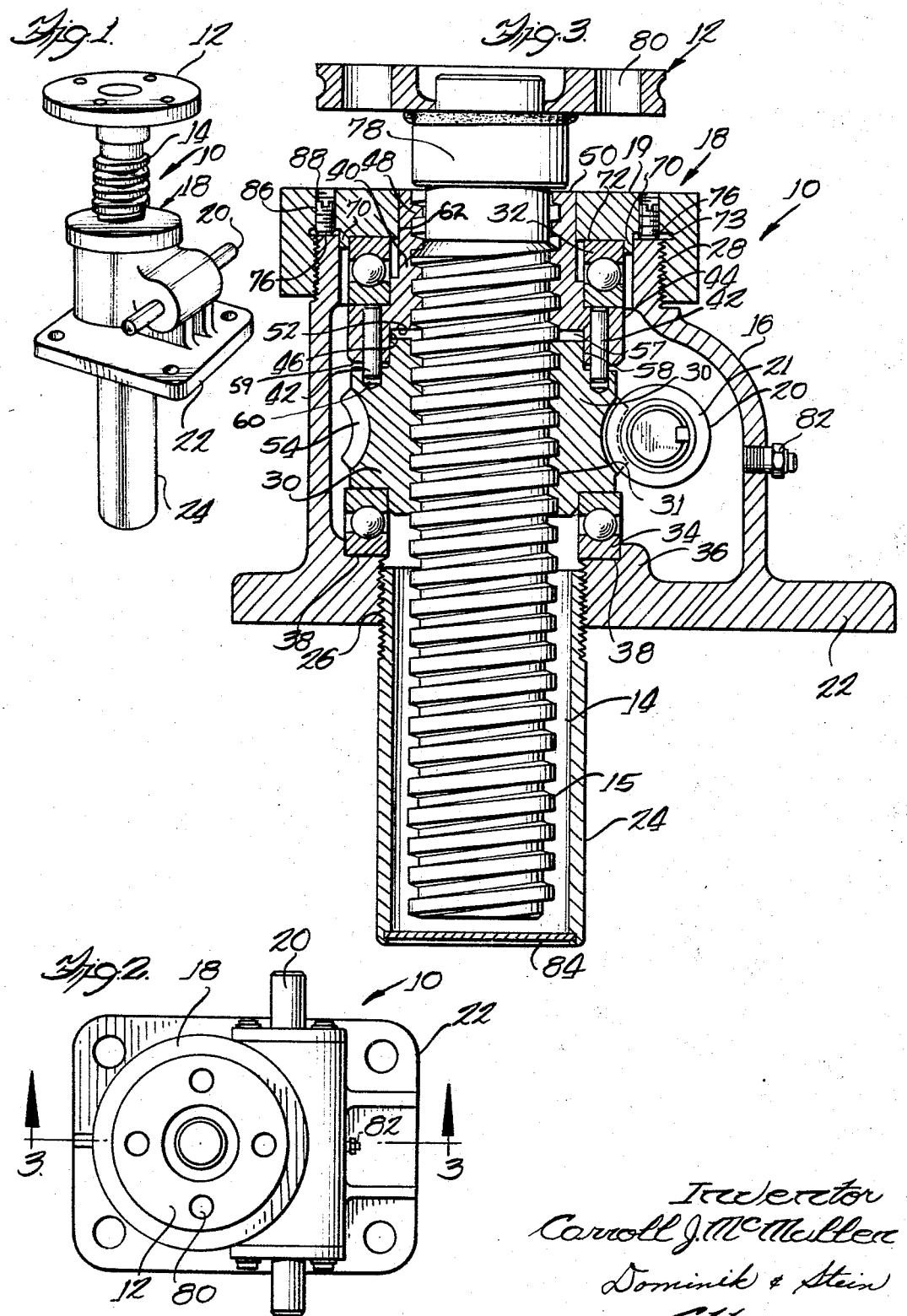
Inventor
Carroll J. McMullen
Dominik & Stein
Attorneys

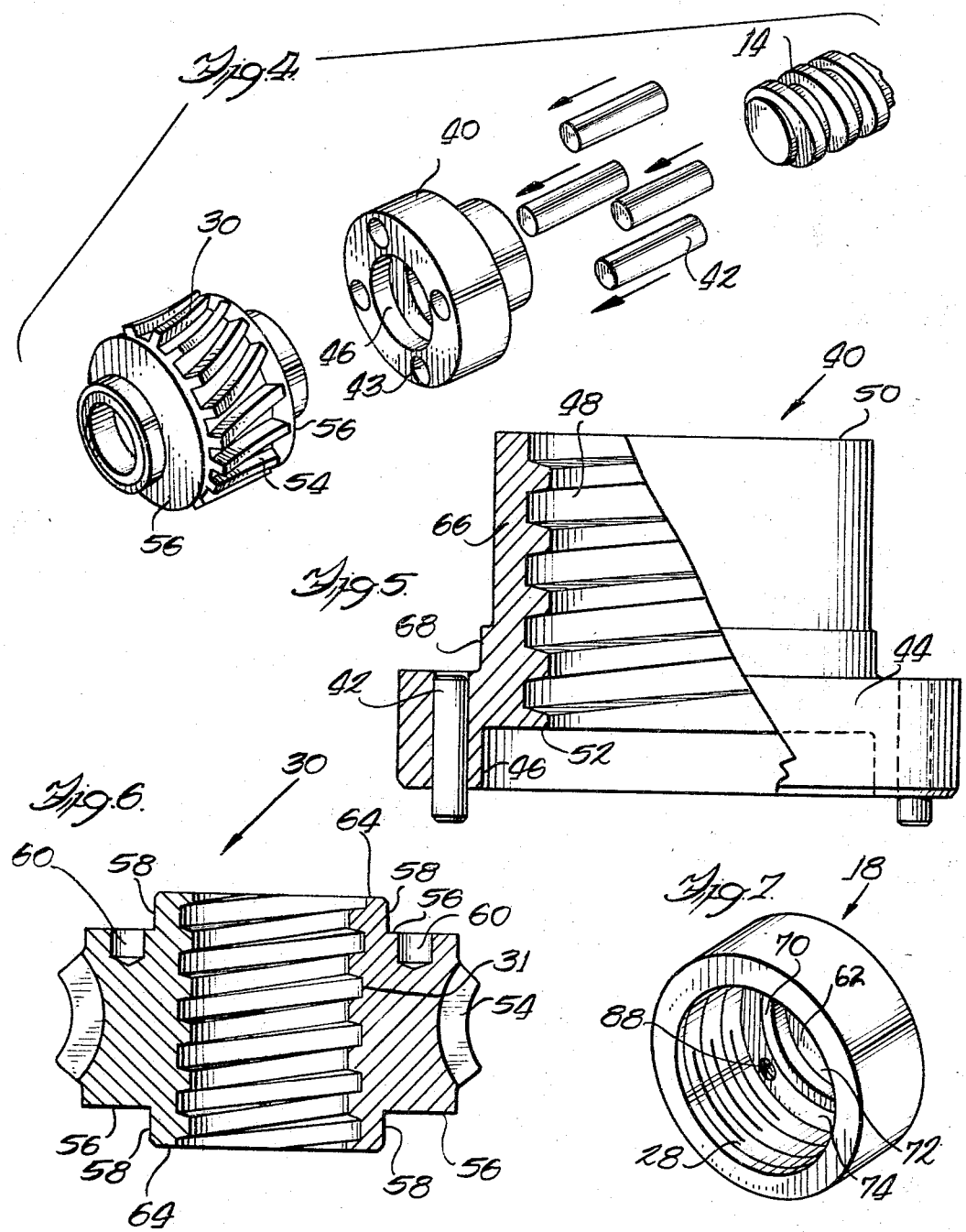

United States Patent Office 3,323,777
Patented June 6, 1967

3,323,777
ANTI-BACKLASH WORM GEAR JACK
Carroll J. McMullen, Charlotte, N.C., assignor to Duff-Norton Company, Charlotte, N.C., a corporation of North Carolina
Filed Oct. 28, 1964, Ser. No. 407,149
7 Claims. (Cl. 254—103)

The present invention relates to an anti-backlash worm gear jack.

Worm gear jacks of the character employing a lifting screw and a worm gear threaded thereto, the worm gear being driven by a worm shaft which is perpendicular to the lifting screw are well known. They find wide application in paper making machinery, foundries, missile bases, and a whole host of applications where precision adjustment is required. In most such worm gear jacks, the worm gear is made of a relatively soft material such as aluminum bronze, whereas the lifting screw and the worm screw may be of a heat treated hardened steel. Necessarily the principle wear will result on the interior threaded portion of the worm gear, and ultimately induce backlash or lost motion into the jack when a reversal of the load from tension to compression, or vice versa, occurs.

In the past certain expedients have been employed to attempt to eliminate this backlash by adjustment. One such expedient is to split the worm gear in half and provide for each half being in spaced relation to the other, thereby clampingly engaging the threads on the lifting screw through progressive adjustment. Such a system suffers from the distinct disadvantage of breaking up the worm gear tooth contact with the worm thread, and oftentimes increasing the tooth pressure by 100%. In addition misalignment can occur between the two halves of the split worm gear which will result in additional friction loading. In the event the interior thread wear is uniform on both portions of the worm gear nut halves, there is no safety factor in the event the threads wear through. Additionally, the split nut proposal, as well as other proposals with exterior collars, and the like, prove more expensive to machine and assemble thereby increasing the manufacturing cost of the basic worm gear jack.

In accordance with the present invention, a separate anti-backlash nut threadedly receives the lifting screw, and is operatively adjustable in pressure relationship to the worm gear, and is rotatably driven by the worm gear. In this manner the basic worm gear construction is unchanged from that for which the jack is designed. Thus the wear characteristics of the worm gear teeth and the worm thread are undisturbed from the original design, and accordingly wear at this point is minimized. In other devices having a split worm gear, the wearing characteristic of the worm gear teeth is sacrificed for the anti-backlash features of the lifting screw relationship with the worm gear, actually additional backlash can be introduced in the worm gear teeth and worm thread relationship which tends to cancel out the effectiveness of the anti-backlash device itself.

A further distinct advantage achieved by the provision of a separate anti-backlash nut which is internally threaded follows from the relatively light loading on the anti-backlash nut threads which permits the anti-backlash nut to carry the entire load in the event of a failure of the teeth engagement between the lifting screw and the worm gear.

A further object and advantage of the present invention stems from its ease of adjustability by a simple rotation of the shell cap of the worm gear jack which also serves as its cover. A further related object of the invention is to provide an indicator of the amount of backlash that has developed in the jack as a result of wear on the screw and worm gear threads.

A further object of the present invention is to provide an anti-backlash worm gear jack modification in which the load carrying capacity of the basic worm gear jack is unaffected by the modification.

A further detailed object of the present invention looks to the provision of an anti-backlash device which inherently limits the worm gear thread wear to a fixed minimum well within safety standards.

Still another and more detailed object of the invention looks to the provision of an anti-backlash device on a worm gear jack in which the forces in the pins connecting the anti-backlash nut with the worm gear are confined to shear by eliminating bending moment due to the interconnecting pilot type engagement between an anti-backlash nut and the worm gear thereby further insuring even wear and greater safety.

Further objects and advantages of the present invention will become apparent as the following description of an illustrative embodiment proceeds taken in conjunction with the accompanying drawings in which:

FIGURE 1 is a perspective view of a typical worm gear jack in which the subject anti-backlash device is employed.

FIGURE 2 is a top view of the worm gear jack shown in FIG. 1.

FIGURE 3 is a transverse sectional view taken along the long axis of the worm gear jack shown in FIG. 1 at section 3—3 of FIG. 2.

FIGURE 4 is a perspective exploded partially broken view of the relationship between the worm gear, anti-backlash nut, connecting pins, and lifting screw.

FIGURE 5 is an enlarged front elevation of the anti-backlash nut partially sectioned.

FIGURE 6 is an enlarged transverse sectional view of the worm gear as modified for co-action with the anti-backlash nut.

FIGURE 7 is a perspective view of the shell cap cover of the worm gear jack.

The general environment of the invention is illustrated in FIGURES 1 and 2. There it will be seen that a typical worm gear jack 10 is illustrated. The worm gear jack 10 supports a load on a top plate 12 which in turn is connected to the lifting screw 14. The lifting screw 14 enters the shell cap 18, and extends through the bottom of the housing 16 being encased in a lifting screw bottom pipe 24 for protection. A shell cap 18 receives the upper portion of the lifting screw 14, and also serves to adjust the anti-backlash device in a manner to be described in greater detail hereinafter. A worm drive shaft 20 is positioned perpendicular to the lifting screw 14, and in spaced relationship to it, passing also through a portion of the housing. A base 22 is provided for securing the worm gear jack 10 to any suitable reference table, platform, or hoist machine. In the event the top plate 12 is not secured to a work piece by means of the load mounting holes 80, it may prove necessary to key the lifting screw 14 into the housing 16, or elsewhere, to secure the same against rotation. In a typical installation, the lifting screw threads 15 engage the worm gear 30 by means of the internal worm gear threads 31. The worm drive thread 21 engages the worm gear teeth 54, and by rotation of the worm drive shaft 20, the worm gear 30, the internal worm gear threads 31 advance the lifting screw 14. In a standard worm gear jack with the aforementioned general elements, there can be a backlash of 10–12 thousandths of an inch in the lifting screw thread plus 2–3 thousandths backlash in the load bearings. An additional backlash of 1 thousandths to 2 thousandths in the worm mounting is also experienced. Therefore, the total backlash in a worm gear jack can be somewhere between 13–

17 thousandths inches. This backlash is due not only to normal manufacturing tolerances, but also to the fact that there must be certain clearances to prevent binding and galling when the jack is under load. Usually the backlash is not a problem unless the load on the jack changes from compression to tension.

With the increasing use of worm gear jacks for positioning with precision, both in compression and tension, an elimination of the inherent backlash of 13 thousandths to 17 thousandths of an inch becomes imperative. The present invention deals with the holding of such backlash to an irreducible minimum, while simultaneously permitting ready modification of standard worm gear jack designs for modification in the field, and actually enhancing the safety features within the jack.

As illustrated in FIGURE 3, an anti-backlash nut 40 is positioned immediately above the worm gear 30. The anti-backlash nut 40 is connected by means of driving pins 42 to the worm gear 30, the driving pins 42 extending into the drive pin receiving holes 60 in the worm gear 30. A coupling collar 44 extends axially downwardly from the anti-backlash nut interior threads 48 and exterior thereto defining a shoulder 52 with an interior cylindrical segment like sleeve 46. The sleeve 46 is proportioned to slidingly engage the worm gear connecting boss segment 58. The shoulder 52 of the anti-backlash nut 40 and the worm gear connecting boss segment of the worm gear 30 are initially established in spaced relationship so as to provide an interior periphery gap 57 and an exterior periphery gap 59 between the anti-backlash nut 40 and the worm gear 30, which gaps provide a built-in safety feature, as will be described more fully hereinafter. The shell cap 18 is advanced downwardly by means of the shell cap threads 28, and the thrust bearing 32 transmits this movement and pressure to the anti-backlash nut interior threads 48, thereby putting a load on one face of the lifting screw threads 15, while the interior threads 31 of the worm gear 30 place an opposite loading on the threads. In this manner the backlash due to the loose interfit between the interior threads 31 of the worm gear and the threads of the lifting screw 14 is rendered negligible, and the bulk of the backlash in the assembly reduced to that attributable to the worm drive thread 21.

The above described arrangement provides an indication of the amount of backlash that has developed in the jack as a result of wear on the screw and worm gear threads, as well as a built-in safety feature which guides against operating the jack when the worm gear thread 31 is worn to a dangerous extent. This may be explained as follows: If, originally, the anti-backlash setting is such that the upper edge 50 on the anti-backlash nut 40 is flush with the face 19 of the shell cap 18, then as the screw thread 31 in the worm gear 30 wears, the screw moves axially downward by an amount equal to the wear and will carry the anti-backlash nut 40 with it. This movement can be seen by the corresponding offset between the upper edge 50 of the anti-backlash nut 40 and the face 19 of the shell cap 18. When the shell cap 18 is readjusted and reset so that its face 19 is again flush with the upper edge 50 of the anti-backlash nut 40, the backlash in the screw thread 31 is eliminated. Even if the original adjustment does not give a flush face relationship (the anti-backlash nut 40 may be slightly above or below the face of the shell cap 19) the amount of backlash is still shown by the change in relationship between these two faces. Adjusting the shell cap 18 to restore the original relationship between these faces will always remove the backlash.

The initial gap between the worm gear 30 and the anti-backlash nut 40 at 57 and 59 is so established that it is equal to the maximum allowable amount of wear on the worm gear thread 31. When this gap is eventually used up by repeated adjustments, the final adjustment will result in the load bearing being "locked-up" and will make it impossible to operate the jack 10. Thus, the jack 10 cannot be operated when the worm gear thread 31 is worn to a dangerous extent.

The dimensioning of the shell cap 18 and the threaded connection 28 is such that the gaps 57 and 59 between the anti-backlash nut 40 and the worm gear 30 are less than the gap 73 between the shell cap 18 and the housing 16 so that the load bearing anti-backlash nut 40 and the worm gear 30 will bottom out first. That is, the gaps 57 and 59 will close before the gap 73. The full operative range of the anti-backlash nut 40 can therefore be realized.

While the anti-backlash device shown in FIGURE 3 is disclosed with a pair of thrust bearings including a shell cap thrust bearing 32 and a worm gear thrust bearing 34, it will be appreciated that in some installations a direct connection may be made between the shell cap and the worm gear opposed shoulders 56, as well as the provision of a solid ring engaging the worm gear thrust bearing support boss 36 above the worm gear thrust bearing mounting shoulder 38.

The worm gear teeth 54 are helically cut on the exterior of the worm gear 30, and engage the worm drive threads with a lesser load than that experienced by the threaded interface between the lifting screw 14 and the worm gear interior threads 31. Nevertheless, to keep size within respectable tolerances, sufficient facial area is presented on the worm gear teeth to safely operate within the capacity of the worm gear jack. Because the anti-backlash nut 40 in no way effects the relationship between the worm gear teeth 54 and the worm drive threads 21, no change in design or compromise in face pressures is involved.

In addition, as will be noted particularly in FIGURE 6, the worm gear 30 has worn gear opposed shoulders 56 which serve interchangeably to either engage the sleeve 46 of the coupling collar 44, or the thrust bearings 32, 34. The worm gear 30 may be made completely reversible by positioning the drive pin receiving holes in both of the worm gear opposed shoulders 56. Similarly the worm gear connecting boss segments 58 are each the same which permits the worm gear to be reversed. When the worm gear shoulder 56 abuts the lower face of the anti-backlash nut 40, i.e. when the gaps 57 and 59 are closed, no further advancement can take place between the anti-backlash nut 40 and the worm gear 30. As indicated above, the dimensional design is such as to ensure this limitation of axial motion at a point safely in advance of unsafe wear of the worm gear thread 31.

The driving pins 42 can be slidingly received in holes in the anti-backlash nut 40 and press fitted into the worm gear 30, as illustrated in FIG. 4. However, the driving pins 42 are preferably press fitted into the driving pin mounting holes 43 provided in the coupling collar 44 of the anti-backlash nut 40. Also, the drive pin receiving holes 60 in the worm gear 30 are preferably sufficiently large to permit a sliding fit with the drive pins 42. At its other end, the anti-backlash nut presents an upper face here termed the backlash indicating end 50 which is the termination of the thread sleeve portion 66 of the anti-backlash nut. The connecting shoulder 68 of the anti-backlash nut cooperates with the upper face of the coupling collar 44 to provide a seat for the shell cap thrust bearing 32. The recess portion defined inside the shell cap thrust bearing 32 as observed in FIG. 3 provides clearance for adequate lubrication of the thrust bearing. The shell cap 18 is provided with a shell cap bore 62 which slidingly engages the exterior cylindrical portion of the thread sleeve portion 66 of the anti-backlash nut 40. A shell cap retainer ring 70 depends in annular fashion from the interior base portion of the shell cap, and engages the housing adjacent the shell cap threads 28, and also serves to retain and position the shell cap thrust bearing 32. The thrust bearing annular shoulder presses down on the shell cap thrust bearing 32 in response to the rotation of the shell cap 18 and its progressive advancement toward the worm gear 30.

As also will be observed in FIGURE 3, the conventional top plate support collar 78 is employed to engage the top plate 12. A single grease fitting 82 is provided in the housing (see FIG. 3) which supplies sufficient grease to adequately lubricate all of the members having relative movement. Radial lubrication bores (not shown) in the worm gear 30 transmit lubricant which is force fed by means of the worm drive screw threads 21 interiorly of the worm gear 30, and thereafter spread along the lifting screw threads 15. Protection of the exposed threads is provided by means of the lifting screw bottom pipe 24 as referred to above, the same being removably secured to the housing 16 by means of lifting screw bottom pipe threads 26, with a pipe cover plate 84 at the very bottom completing the housing. A bellows boot may be attached between the top plate 12 and the shell cap 18 to further protect the exposed portion of the lifting screw when this is desired. Such an installation may be made by providing an annular groove around the upper portion of the exterior of the shell cap 18, and by means of spanner wrench recesses (not shown), the shell cap can still be adjusted to take up backlash without removing the bellows.

In review it will be seen that an anti-backlash device has been disclosed and described in detail in which a modification of a standard worm gear jack can be made to incorporate the anti-backlash feature merely by adding an anti-backlash nut, a specially modified shell cap, and providing for driving pin receiving holes within the worm gear. The anti-backlash nut interior threads are of sufficient length, and subjected to minimal load, so that their wear is negligible compared to the interior threads on the worm gear. Therefore when the worm gear threads become dangerously worn, or possibly would be stripped by an unusual application of load, the anti-backlash nut threads are sufficient to support the load and save the same from falling and possible severe damage. In addition, the initial positioning, or arrangement, between the anti-backlash nut 40 and the worm gear 30 provides a built-in safety feature which, as described above, guards against operating the jack when the worm gear thread 31 is worn to a dangerous extent. Also, the unique proportion of the anti-backlash nut presents an indicating face at the shell cap where a visual inspection will determine the amount of backlash which has developed as a result of worm gear thread wear that has occurred during the operation of the jack. This can be readily observed by the operator at those times when adjustments are made for wear of the worm gear thread. The shell cap is securely locked in place by means of the shell cap set screws 86 which are Allen-headed type set screws extending through the threaded set screw bores 88.

A still further advantage of the above described design which has not been particularly elaborated upon, but which is of considerable importance, is that there is very little lateral movement on the extended lifting screw 14 due to the close fit contact on both flanks of the screw, by the joint action of the worm gear 30 and the anti-backlash nut 40. Thus lateral movement of the lifting screw 14 is also reduced.

While the invention has been described in connection with specific embodiments and applications, no intention to restrict the invention to the examples shown is contemplated, but to include within the invention all of that subject matter defined by the spirit as well as the letter of the annexed claims.

I claim:

1. A worm gear jack having a lifting screw, a worm gear having a center threaded portion mating with the lifting screw, the lifting screw being normally constrained against rotation and the worm gear being normally constrained against axial displacement, a housing operatively substantially confining said lifting screw and worm gear, an anti-backlash nut having a center threaded portion adapted to engage the lifting screw, axial slip fit means interconnecting the anti-backlash nut and worm gear in coaxially confined spaced relationship, sliding drive means interconnecting the anti-backlash nut and worm gear thereby translating rotation of one to rotation of the other while permitting axial relative motion, a shell cap, and adjustable means securing the shell cap to the housing for axial movement along the lifting screw in abutting relationship with the anti-backlash nut whereby the shell cap adjustably prevents axial movement of the lifting screw attributable to wear on the internal screw threads of the worm gear.

2. A worm gear jack having a lifting screw, a worm gear having a center threaded portion mating with the lifting screw, the lifting screw being normally constrained against rotation and the worm gear being normally constrained against axial displacement, a housing operatively substantially confining said lifting screw and worm gear, an anti-backlash nut having a center threaded portion adapted to engage the lifting screw, a sleeve having an annular end surrounding the anti-backlash nut center threaded portion, axial slip fit means interconnecting the anti-backlash nut and worm gear is coaxially confined spaced relationship, sliding drive means interconnecting the anti-backlash nut and worm gear thereby translating rotation of one to rotation of the other while permitting axial relative motion, a shell cap, adjustable means securing the shell cap to the housing for axial movement along the lifting screw in abutting relationship with the anti-backlash nut whereby the shell cap adjustably prevents axial movement of the lifting screw attributable to wear on the internal screw threads of the worm gear, and means defining a center bore in said shell cap proportioned to receive and permit protrusion of the annular end of the anti-backlash nut whereby the relative position of the annular end of the anti-backlash nut with respect to the top face of the shell cap will give a visual indication of the amount of backlash that may have developed on the screw threads.

3. A worm gear jack having a lifting screw, a worm gear having a center threaded portion mating with the lifting screw, the lifting screw being normally constrained against rotation and the worm gear being normally constrained against axial displacement, a housing operatively substantially confining said lifting screw and worm gear, an anti-backlash nut having a center threaded portion adapted to engage the lifting screw, sleeve and shoulder means interconnecting the anti-backlash nut and worm gear in coaxially confined spaced relationship, a plurality of sliding pins interconnecting the anti-backlash nut and worm gear thereby translating rotation of one to rotation of the other while permitting axial relative motion, a shell cap, thread means securing the shell cap to the housing for axial movement along the lifting screw in abutting relationship with the anti-backlash nut whereby the shell cap adjustably prevents axial movement of the lifting screw attributable to the wear on the internal screw threads of the worm gear, the spaced relationship between the anti-backlash nut and the worm gear defining the maximum allowable amount of wear on the worm gear thread so that when the anti-backlash nut and the worm gear abut one another further adjustment of the shell cap will render the worm gear jack inoperative to prevent the jack from being operated when the worm gear thread is worn to a dangerous extent.

4. A worm gear jack having a lifting screw, a worm gear having a center threaded portion mating with the lifting screw, the lifting screw being normally constrained against rotation and the worm gear being normally constrained against axial displacement, a housing operatively substantially confining said lifting screw and worm gear, an anti-backlash nut having a center threaded portion adapted to engage the lifting screw, a sleeve having an annular indicator end surrounding the anti-backlash nut center threaded portion, axial slip fit means interconnecting the anti-backlash nut and worm gear in coaxially confined spaced relationship, sliding drive means interconnecting the anti-backlash nut and worm gear thereby translating rotation of one to rotation of the other while permitting axial relative motion, a shell cap, adjustable means securing the shell cap to the housing for axial movement along the lifting screw in abutting relationship to the anti-backlash nut whereby the shell cap adjustably prevents axial movement of the lifting screw attributable to the wear on the internal screw threads of the worm gear, means defining a center bore in the shell cap through which the indicator end of the anti-backlash nut protrudes during safe thread wear conditions thereby permitting visual indication of thread wear.

5. In a worm gear jack comprising a threaded lifting screw, a worm gear in central threaded engagement with the lifting screw, worm gear rotating means, and a housing enclosing and confining the same, an anti-backlash assembly comprising, in combination, an anti-backlash nut having a central thread proportioned to mate with the lifting screw, an annnular worm gear coupling collar extending axially from one end of the anti-backlash nut, an interior cylindrical wall portion in said collar of larger diameter than the lifting screw defining a sleeve portion to receive the worm gear, means defining drive pin receiving holes in the coupling collar co-axial therewith and radially outside the worm gear sleeve, a worm gear shoulder axially extending from one end of the worm gear proportioned for sliding fit with the anti-backlash sleeve, corresponding drive pin receiving holes in the worm gear, drive pins proportioned to fit within the pin holes to drivingly couple the anti-backlash nut and worm gear, a shell cap having a central bore to receive the lifting screw, said shell cap having means threadedly engaging the housing for longitudinal adjustment along the axis of the lifting screw, and connecting means operatively translating a shell cap axial displacement to the anti-backlash nut whereby opposed lifting screw thread face engagement is effected between the anti-backlash nut center threads and the worm gear center threads.

6. In a worm gear jack comprising a threaded lifting screw, a worm gear in central threaded engagement with the lifting screw, worm gear rotating means, and a housing enclosing and confining the same, an anti-backlash assembly comprising, in combination, an anti-backlash nut having a central thread proportioned to mate with the lifting screw, an annular worm gear coupling collar extending axially from one end of the anti-backlash nut, an annular indicator face extending from the other end of the anti-backlash nut, an interior cylindrical wall portion in said collar of larger diameter than the lifting screw defining a sleeve portion to receive the worm gear, means defining drive pin receiving holes in the coupling collar co-axial therewith and radially outside the worm gear sleeve, a worm gear boss axially extending from one end of the worm gear proportioned for sliding fit with the anti-backlash sleeve, corresponding drive pin receiving holes in the form gear, drive pins proportioned to fit within the pin holes to drivingly couple the anti-backlash nut and worm gear, a shell cap, central bore means in the shell cap to receive the lifting screw and permit the anti-backlash nut indicator face to be seen to thereby give visual evidence of any increase in the amount of backlash in the screw thread, said shell cap having means threadedly engaging the housing for longitudinal adjustment along the axis of the lifting screw, and connecting means operatively translating the shell cap axial displacement to the anti-backlash nut whereby opposed lifting screw thread face engagement is effected between the anti-backlash nut center threads and the worm gear center threads.

7. In the apparatus of claim 6, wherein the worm gear is received within the sleeve portion of the anti-backlash nut in spaced relationship so that a gap therebetween is provided which defines the maximum allowable amount of wear of the worm gear thread, the worm gear jack being rendered inoperative when said gap is closed and said shell cap is adjusted to clamp down on said connecting means, to prevent the jack from being operated when the worm gear thread is worn to a dangerous extent.

References Cited

UNITED STATES PATENTS 3,176,963  4/1965  Sturm _____ 254—103

FOREIGN PATENTS 652,199  4/1951  Great Britain.
956,958  4/1964  Great Britain.
960,358  6/1964  Great Britain.

OTHELL M. SIMPSON, *Primary Examiner.*